United States Patent
Goi et al.

(10) Patent No.: US 7,479,182 B2
(45) Date of Patent: Jan. 20, 2009

(54) BLACK INK FOR INK-JET PRINTING

(75) Inventors: Katsunori Goi, Kanagawa (JP); Hirotaka Iijima, Hachioji (JP); Hitoshi Morimoto, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 98 days.

(21) Appl. No.: 11/521,986

(22) Filed: Sep. 15, 2006

(65) Prior Publication Data

US 2007/0068419 A1 Mar. 29, 2007

(30) Foreign Application Priority Data

Sep. 29, 2005 (JP) ............................. 2005-283917
Aug. 4, 2006 (JP) ............................. 2006-212990

(51) Int. Cl.
*C09D 11/02* (2006.01)

(52) U.S. Cl. .................................. 106/31.6; 106/31.86

(58) Field of Classification Search ................ 106/31.6, 106/31.86
See application file for complete search history.

(56) References Cited

U.S. PATENT DOCUMENTS 5,184,148 A * 2/1993 Suga et al. .................. 347/100

FOREIGN PATENT DOCUMENTS

| JP | 05-320551 A | 12/1993 |
| JP | 09-176538 A | 7/1997 |
| JP | 10-060328 A | 3/1998 |
| JP | 10-060330 A | 3/1998 |
| JP | 10-272828 A | 10/1998 |
| JP | 10-316915 A | 12/1998 |
| JP | 2001-348523 A | 12/2001 |
| JP | 2003-073595 A | 3/2003 |
| JP | 2005-220296 A | 8/2005 |
| JP | 2005-220297 A | 8/2005 |

* cited by examiner

*Primary Examiner*—Helene Klemanski
*Assistant Examiner*—Veronica Faison Gee
(74) *Attorney, Agent, or Firm*—Frishauf, Holtz, Goodman & Chick, P.C.

(57) ABSTRACT

A black ink for ink-jet printing comprising: a) a carbon black pigment exhibiting a DBP oil absorption of not more than 150 $cm^3/100$ g and a pH of more than 6, b) a solvent exhibiting a surface tension of 25-40 mN/m at 25 ° C. a viscosity of 1-50 mPa·s at 25 ° C. and a vapor pressure of not more than 133 Pa at 25 ° C. a solvent content of which being not less than 50 weight % and not more than 90 weight % based on the total ink weight, and c) water, the content of which being not less than 10 weight % and less than 45 weight %.

9 Claims, No Drawings

BLACK INK FOR INK-JET PRINTING

This application is based on Japanese Patent Application No. 2005-283917 filed on Sep. 29, 2005, and No. 2006-212990 filed on Aug. 4, 2006, in Japanese Patent Office, the entire content of which is hereby incorporated by reference.

FIELD OF THE INVENTION

The present invention relates to a novel black ink for ink-jet printing.

BACKGROUND OF THE INVENTION

In recent years, since an ink-jet recording system makes it possible to easily form images at lower cost, it has been widely applied to various printing and imaging fields such as photographic imaging, various types of printing, or special printing such as marking or color filters. Specifically, due to the development of ink-jet recording apparatuses capable of controlled ejection of minute ink droplets, ink whose color reproduction range, durability, and ejection adaptability have been improved, and special ink-jet paper whose ink absorbability, the color formation of colorants, and surface glossiness have been enhanced, whereby image quality is more and more approaching that of silver salt photography.

However, this image recording system necessitates special ink-jet paper and exhibits problems in which usable recording media are limited, and the cost of preparing the recording media is relatively high.

On the other hand, in an office environment, there has been greater demand for a new system capable of performing full color printing on various recording media at high speed without limitation of recording media (for example, using plain paper, coated paper, art paper, and dual-sided printing on plain paper).

Regarding ink-jet ink compositions, various studies have been conducted from several viewpoints, such as high-speed printing and excellent text reproduction on plain paper, without strike-through (being a phenomenon that printed ink goes through a printing medium and the text and/or image is seen on the reverse), feathering and bleeding of the image, and further, quick ink penetration for quick drying.

As one resulting type of ink-jet ink, a so-called water-based ink-jet ink has been widely employed, the water content of which ink is more than 50 weight %. However, in cases when image recording is conducted employing such water-based ink-jet ink onto copy paper for electrophotography or plain paper such as bond paper and medium quality paper, curling and cockling of plain paper become major drawbacks, adding to the problems of image strike-through and feathering caused by penetration of the ink.

Related to the above-cited problems, disclosed is an ink-jet recording method employing the ink, the penetration of which is enhanced by specific wetting time and the absorption coefficient to a recording medium of the Bristow method. (For example, please refer to Patent Document 1.) However, with this method, since the coloring material in the ink also permeates the interior of the plain paper simultaneously, a decrease of the image density and strike-through of the ink increase, resulting in a serious drawback of lack of readability of dual side printing.

Further, disclosed is an ink-jet ink containing a specific amide compound, a pyridine derivative, an imidazoline compound, or a urea compound as a curling reduction agent. (For example, please refer to Patent Document 2.) However, this method exhibits the problem of easy clogging nozzles of a recording head concurrent with ink drying.

Further, as a method to decrease the curling cited above, proposed is an ink-jet recording method in which curling is made more acceptable by providing a water containing solution to the rear side of the image printed surface. (For example, please refer to Patent Document 3.) However, this method exhibits drawbacks of not allowing dual sided printing and easily causing media jamming during conveyance due to decreased strength of the plain paper due to an increased amount of ink and the curling balancing solution.

Further, a solvent system ink which enables high speed printing was also studied as a substituent for a water-based ink. That is, by employing an oil-based ink (being a solvent system ink-jet ink) which contains a volatile solvent to raise drying efficiency, it is possible to print at higher rates on plain paper, because the ink penetrates into a recording medium very quickly and also dries quickly, so that curling of the recording medium does not result. However, the solvent system ink exhibits high permeability into plain paper, resulting in a big hurdle to surmount for dual sided printing, specifically onto plain paper due to poor text reproduction and strike-through of the recording medium.

Further, there is a prior art in which a black ink for a water-based ink-jet ink contains carbon black pigment dispersed in a dispersing medium of a non-polar insulating solvent. (Please refer, for example, to Patent Document 4.) Also, there is other prior art of a black ink which contains carbon black dispersed in a dispersing medium containing water as the main component, a water-soluble solvent and a polymer dispersing agent. (Please refer, for example, to Patent Documents 5-8.)

However, with these methods, it is impossible to stably maintain the carbon black in the ink in a dispersed state in the solvent. Therefore, the problem which is caused by flocculation of the carbon black particles in the ink, resulting in clogging of nozzle orifice of the recording head, is still not resolved.

For this reason, ink-jet inks, ejection property of which and decapping suitability are improved and which exhibit superiority in strike-through resistance, high text quality and curling characteristics, and ink-jet recording methods employing these inks, are disclosed. (For example, please refer to Patent Documents 9 and 10.)

Disclosed is the possibility to produce ink-jet inks featuring superiority in ejection stability and decapping performance, and also higher text quality of the formed image, strike-through resistance, and reduced curling characteristics of the printed recording material with these methods, in which a water-insoluble coloring material is dispersed in a dispersing medium, in which a solvent is incorporated in an amount of more than 50 but less than 90 weight % based on the total ink weight, and the water content is more than 10 but less than 45 weight %.

However, in the above-cited ink, the dispersion stability of a water-insoluble coloring material, specifically carbon black employed in the black ink, is poor. That is, the pigment particle diameter increases over time, and the particles in the ink separate from the liquid, resulting in clogging of the head orifices when the ink is ejected.

[Patent Document 1] Unexamined Japanese Patent Application Publication No. (hereinafter, referred to as JP-A) 10-316915
[Patent Document 2] JP-A 9-176538
[Patent Document 3] JP-A 10-272828
[Patent Document 4] JP-A 5-320551
[Patent Document 5] JP-A 10-60330

[Patent Document 6] JP-A 2003-73595
[Patent Document 7] JP-A 2001-348523
[Patent Document 8] JP-A 10-60328
[Patent Document 9] JP-A 2005-220296
[Patent Document 10] JP-A 2005-220297

DISCLOSURE OF THE INVENTION

Object of the Invention

The present invention was achieved in view of the above concerns. An object of this invention is to provide an ink-jet black ink which exhibits high dispersion stability of the carbon black pigment in the ink employed in the ink-jet black ink, no flocculation of carbon black during long-term storage, occurrence of reduced clogging at the head nozzles when the ink is ejected, and also achieves high printing quality, with no portion of the image missing (being without defects of white and/or black spots), and stable print density of text using the black ink.

Means to Solve the Problem

The above problems of this invention have been overcome by the following means.

Item 1. A black ink for ink-jet printing comprising:

a) a carbon black pigment exhibiting a DBP oil absorption of not more than 150 $cm^3/100$ g at a pH of not more than 6, b) a solvent exhibiting a surface tension of 25-40 mN/m at 25° C. a viscosity of 1-50 mPa·s at 25 ° C. and a vapor pressure of not more than 133 Pa at 25° C. a solvent content of which being not less than 50 weight % and not more than 90 weight % based on the total ink weight, and c) water, a water content of which being not less than 10 weight % and less than 45 weight %.

Item 2. The black ink for ink-jet printing of Item 1 above, wherein the solvent exhibits a surface tension of 25-30 mN/m at 25° C. and the viscosity of 3-30 mPa·s at 25° C.

Item 3. The black ink for ink-jet printing of Item 1 or 2 above, wherein the vapor pressure of the solvent at 25° C. is 1-70 Pa.

Item 4. The black ink for ink-jet printing of any one of Items 1-3 above, wherein the solvent content is not less than 65 weight % and less than 80 weight % based on the total weight of the ink, and also the water content is not less than 20 weight % and less than 35 weight %.

Item 5. The black ink for ink-jet printing of any one of Items 1-4, wherein the solvent contains a polyalcohol or derivative thereof.

Item 6. The black ink for ink-jet printing of Item 5 above, wherein the polyalcohol, or derivative thereof, is triethylene glycol monomethyl ether, dipropylene glycol monomethyl ether, tripropylene glycol monomethyl ether, or 2-methyl-2, 4-pentane diol.

Item 7. The black ink for ink-jet printing of any one of Items 1-6, wherein the carbon black pigment is an oil-furnace carbon black pigment.

Item 8. The black ink for ink-jet printing of Item 7 above, wherein the carbon black pigment is an oil-furnace carbon black pigment exhibiting a pH of not more than 4.

Item 9. The black ink for ink-jet printing of Item 7 or 8, wherein the carbon black pigment is an oil-furnace carbon black pigment exhibiting a pH of 2.0-3.5, and a DBP oil absorption of 55-145 $cm^3/100$ g.

Effects of the Invention

According to the present invention, it is possible to provide an ink-jet black ink, in which the carbon black pigment employed for the black ink exhibits high dispersion stability, reduced occurrence of flocculation after long-term storage, reduced occurrence of clogging of head orifices when the ink is ejected, and also achieves stable printing density without missing portions of images or text formed by the black ink.

DESCRIPTION OF THE PREFERRED EMBODIMENTS

The preferred embodiments of this invention will now be detailed below.

As results of diligent study in view of the above concerns, the inventors of the present invention experimented, resulting in this invention. That is, an ink-jet ink which exhibits exhibiting improved ejection property at the recording heads and superiority in text quality when printed onto plain paper may be obtained by employing a black ink for ink-jet printing, in which, a carbon black pigment exhibiting DBP oil absorption of at least 150 cm3/100 g at a pH of 4 or less is incorporated in the following solvent, and a solvent which exhibits the specific surface tension, viscosity and vapor pressure defined in this invention, incorporated in an amount of not less than 50 weight % but less than 90 weight % based on the total ink weight, and the water content of the solvent is not less than 10 weight % but less than 45 weight %.

Further, it was found that the dispersibility of pigment in a solvent-rich system, the weakly-polar dispersing medium is brought to more stability employing an acid carbon black pigment exhibiting DBP oil absorption of at most 150 $cm^3/$100 g at a pH of at most 6.

The mechanism of dispersibility of pigment becoming more stable in not clear, but it is assumed to approximately be as follows.

In an ink solvent of a solvent-rich composition, the polarity is not as strong as water, but is not as high as in a non-polar solvent, and it is somewhat in the state of carbon black being suspended in a weakly-polar solvent. In this situation, carbon black exists in the ink in such a state that a polymer dispersing agent is adsorbed onto the surface of black carbon, however the effect of steric hindrance to overcome the intermolecular force among carbon black particles is not obtained by only the polymer chains of the dispersing agent. For this reason, flocculation of carbon black particles tends to be evident.

Consequently, when acidic carbon black particles are used in a weakly-polar ink, it turned out that an electrostatic hindrance effect between the solvent and the surface of carbon black increases, the result being that the carbon black particles cause poor flocculation in the presence of the solvent. Carbon black is capable of adhering onto a functional group on the surface in the production process, so that it is possible to treat the surface to become acidic, neutral, or alkaline. In this invention, of these particles, specifically, acidic carbon black, being a pH of 6 or less is employed.

Further, it also turned out that dispersion stability was adequate when the structure of carbon black was smaller to a certain extent. To put it simply, when DBP oil absorption, being an index of structure, is not more than 150 $cm^3/100$ g, the carbon black structure tends to be easily damaged, and the structure also tends not to form a complex structure, the electrical countering of the hindrance layers among the pigment surfaces is lowered, and further, it was revealed stability of the electrostatic hindrance effect between the carbon black surface and the solvent.

Hereafter, the details of the present invention will be described.

Solvent

In the ink-jet ink of the present invention (hereinafter, referred to as only an ink), it is essential that a solvent exhibiting a surface tension of 25-40 mN/m at 25° C. a viscosity of 1-50 mPa·s at 25° C. and a vapor pressure of less than 133 Pa at 25° C. is incorporated as a dispersing solvent in an amount of 50 wt % or more and less than 90 wt % compared to the total weight of the ink.

As described above, in the solvent of this invention (being a water-based solvent), it is characterized that as one requirement, the surface tension is 25-40 mN/m at 25° C. but it is preferably 25-35 m/m. Further, another characteristic is that the viscosity is 1-50 mPa·s at 25° C. but preferably is 3-30 mPa·s. Further, it is still another characteristic that the vapor pressure is not more than 133 Pa at 25° C. but is preferably 1-70 Pa.

A solvent (being a water-based solvent) employable in this invention is not specifically limited, as long as it satisfies all of the above three requirements, and listed solvents may, for example, be ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, propylene glycol monobutyl ether, dipropylene glycol monomethyl ether, dipropylene glycol monoethyl ether, dipropylene glycol monopropyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tripropylene glycol dibutyl ether, 3-methyl-2,4-pentane diol, and diethylene glycol monoethyl ether acetate.

Each characteristic value of the water-based solvent defined in this invention is determined with each data described in, for example, "New Edition Solvent Pocketbook", edited by the Society of Synthetic Organic Chemistry, Japan, published by Ohm-Sha, Ltd., 1994, or other equally well-known measuring methods.

In the ink of this invention, it is one of the defining characteristics that together with the above water-based solvent, water is incorporated in the ink in an amount of not less than 10 weight % but less than 45 weight % compared to the total ink weight, and preferably is not less than 20 weight % but less than 35 weight %. By having the water content in the ink within the range defined in this invention, it is possible to set both the characteristics of ink penetration rate into plain paper and the curling resistance to optimal parameters.

Carbon Black Pigment

As a black pigment, carbon black which exhibits DBP absorption of not more than 150 cm$^3$/100 g at a pH of not more than 6, may be employed without any specific limitation. The examples of carbon black preferably include Oil Furnace Black, Channel Black, Lamp Black, Acetylene Black, and Ketjen Black. The details of these black pigments are described in The Carbon Black Handbook, edited by The Carbon Black Association, as well as in The Carbon Black Yearbook, published by The Carbon Black Association.

An oil-furnace carbon black pigment commonly employed as a carbon black pigment is preferable, and specifically the oil furnace carbon black pigment is preferably an acidic carbon black pigment exhibiting the pH of 2-4. The most preferable one is an oil furnace carbon black pigment exhibiting a pH of 2.0-3.5, and also the DBP absorption value of 55-145 cm$^3$/100 g.

A carbon black pigment employed in this invention is preferably used after being dispersed by a dispersing machine together with a dispersing agent and other appropriate additives in accordance with targeted purposes. As a dispersing machine, listed are a ball mill, a vibration mill, a sand mill, a line mill, and a high-pressure homogenizer, which are all well-known in the art.

The average particle diameter of pigment dispersion elements employed in the ink of this invention is preferably 50-200 nm. In cases when the average particle diameter of the pigment dispersion elements exceeds 200 nm, dispersion becomes unstable, and further, when the average particle diameter becomes less than 50 nm, dispersion stability of pigment dispersion elements tends also to be degraded, resulting in deteriorated ink stability during storage.

Particle diameter measurement of the pigment dispersion elements is conducted by employing a commercially available particle diameter measuring device employing a light scattering method, an electrophoresis method, or a laser Doppler method. Further, it is also possible to determine the average particle diameter by employing a method in which the particle image shooting of at least 100 particles with a transmission electron microscope and the images are analyzed by a statistical treatment with an image analysis software, such as Image-Pro, produced by Media Cybernetics, Inc.

Additives

In the ink of this invention, a surface active agent may be employed as an additive during dispersion. Employable surface active agents include any of a cationic, an anionic, an amphoteric, and a nonionic type.

Examples of cationic surface active agents include an aliphatic amine salt, an aliphatic quaternary ammonium salt, a benzalkonium salt, a benzethonium chloride, a pyridinium salt, and an imidazolinium salt.

Examples of anionic surface active agents include a fatty acid soap, an N-acyl-N-methylglycine salt, an N-acyl-N-methyl-β-alanine salt, an N-acyl glutamate, an acyl peptide, an alkylsulfonic acid salt, an alkylbenzene sulfonate, an alkylnaphthalene sulfonate, a dialkylsulfo succinate, an alkylsulfo acetate, an α-olefin sulfonate, an N-acylmethyl taurate, a sulfated oil, a fatty alcohol sulfate, a secondary fatty alcohol sulfate, an alkyl ether sulfate, a secondary higher alcohol ethoxysulfate, a polyoxyethylene alkylphenyl ether sulfate, a monoglyceride sulfate, a fatty acid alkylolamide sulfuric ester salt, an alkyl ether phosphate salt, and an alkyl phosphate salt.

Examples of amphoteric surface active agents include a carboxy betaine type, a sulfo betaine type, an aminocarboxylate type, and an imidazolinium betaine type.

Examples of nonionic surface active agents include a polyoxyethylene secondery-alcohol ether, a polyoxyethylene alkylphenyl ether, a polyoxyethylene sterol ether, a polyoxyethylene lanolin derivative polyoxyethylene polyoxypropylene alkyl ether, a polyoxyethylene glycerine fatty acid ester, polyoxyethylene castor oil, hydrogenated castor oil, a polyoxyethylene sorbitol fatty acid ester, a polyethylene glycol fatty acid ester, a fatty acid monoglyceride, a polyglyceryl fatty acid ester, a sorbitan fatty acid ester, a propylene glycol fatty acid ester, a sucrose fatty acid ester, a fatty acid alkanolamide, a polyoxyethylene fatty acid amide, a polyoxyethylene alkylamine, alkylamine oxide, acetylene glycol, and acetylene alcohol.

Further, in order to accelerate the ink drop penetration into the plain paper after the ink is ejected, it is preferable to employ a surface active agent. Such surface active agent is not limited as long as it does not reversely affect storage stability of the ink, and which may be the same surface active agent being employable as the additive for dispersion.

Further, in the ink of this invention, the total polyvalent metal ions, such as calcium ions, magnesium ions, and iron ions, is preferably less than 10 ppm., more preferably 0.1-5 ppm., and still more preferably 0.1-1 ppm.

By bringing the polyvalent metal ion in the ink to the amount specified above, it is possible to obtain an ink exhibiting high dispersion stability.

The polyvalent metal ion of this invention may be contained in a sulfate, a chloride, a nitrate, an acetate, an organic ammonium salt, or in an EDTA salt.

In the ink of this invention, if appropriate, other than the above, employed may be various common additives, such as a polysaccharide, a viscosity adjusting agent, a specific resistance regulator, a film-forming agent, an ultraviolet absorbing agent, an antioxidizing agent, an anti-fading agent, a mildewcide, a rust preventing agent, which assist in ejection stability, print head and ink-jet cartridge compatibility, ink storage stability, image storage stability, and enhancement of other performance characteristics. Listed are, for example, microscopic oil droplets such as liquid paraffin, dioctyl phthalate, tricresyl phosphate, and a silicone oil; ultraviolet absorbing agents described in JP-A Nos. 57-74193, 57-87988, 60-72785, 61-146591, 1-95091, and 3-13376; and fluorescent brightening agents described in JP-A Nos. 59-42993, 59-52689, 62-280069, 61-242871, and 4-219266.

The ink of this invention comprising the above compositions preferably exhibits a surface tension of 25-40 mN/m at 25° C. more preferably 25-35 mN/m, but still more preferably 30-35 mN/m. Further, the ink preferably exhibits a viscosity of 1-40 mPa·s at 25° C., more preferably 5-40 mPa·s, but still more preferably 5-15 mPa·s. Further, the dissolved oxygen concentration of the ink of this invention is preferably less than 2 ppm. at 25° C. By controlling the dissolved oxygen concentration to these conditions, foaming of the ink is suppressed, resulting in realization of an ink-jet recording method superior in ejection stability even during high-speed printing. The determination of the dissolved oxygen in the ink may be conducted, for example, by employing a dissolved oxygen measuring apparatus, such as DO-14P (manufactured by DKK-TOA Corp.).

In the image formation method using the ink of this invention, ink-jet printing is conducted by ejection of the ink as ink droplets from an ink jet head of the printer loaded with the ink, being ejected based on digital signals to adhere onto the plain paper.

When image formation is conducted by ejection of the ink of this invention, an employable ink-jet head may be an on-demand type or a continuous one. Further, an ink ejection method may be an electromechanical transducing method (such as a single cavity type, a double cavity type, a vendor type, a piston type, a shared mode type, and a shared-wall type); or an electro-thermal transducing method (such as a thermal ink-jet type, and a Bubble-Jet type (being a registered trade mark).

Of these, methods in the recording method employing the ink of this invention, it is preferable to eject the ink onto plain paper from a piezo type ink-jet recording head having an orifice diameter of less than 30 μm, and further to eject the ink onto the plain paper from a line head method of ink-jet recording heads having an orifice diameter of less than 30 μm.

By printing employing a line head method recording head, as a printing method of an ink-jet printer, compared to a shuttle head method recording head, the printing characteristics of the ink of this invention may be exploited, resulting in completion of rather excellent dot shape (being roundness) and printing accuracy when the ink droplets are deposited onto plain paper. Specifically, in the recording method employing the ink of this invention, image printing may be carried out on both sides of plain paper. In cases when dual-sided printing is conducted, in many cases one side of the plain paper is printed, after which the paper is reversed and conveyed with the printed side down. Since the ink of this invention features the above characteristics, strike-through and bleeding of text are not generated even with dual sided printing, resulting in high density and high quality of text, and further resulting in no conveyance problems and no ink staining of the conveyer belt.

Recording Medium

The plain paper employed in the recording method using the ink of this invention is not specifically limited, but preferable are a non-coated paper, a special printing paper, or a 80-200 μm non-coated paper typically used as an office-use paper. The compositions of the plain paper of this invention are mainly a chemical pulp which are typically represented by LBKP and NBKP, a sizing agent, and a loading material, and other paper-making auxiliary agents may be employed if appropriate, and then paper making is conducted by a conventional method. The wood pulp employed for the plain paper of this invention may be combined with a mechanical pulp and a recycled waste-paper pulp, and these pulps may be employed as main materials without any concern.

The inner sizing agents of the plain paper of this invention include, for example, a rosin size, AKD, an alkenyl succinic anhydride, a petroleum resin system size, an epichlorohydrin, cation starch, and acrylamide.

Further, the loading materials added into the plain paper of this invention include, for example, pulverized silicate, aluminum silicate, diatomaceous earth, kaolin, kaolinite, halloysite, nacrite, dickite, pyrophyllite, sericite, titanium dioxide, and bentonite.

Further, the plain paper of this invention may incorporate a water-soluble polyvalent metal salt from the viewpoint of prevention of strike-through of the ink of this invention and enhancement of fixability of coloring agents. As a water-soluble polyvalent metal salt, there is specific limitation, but added may be, for example, a metal salt of aluminum, calcium, magnesium, zinc, iron, strontium, barium, nickel, copper, scandium, gallium, indium, titanium, zirconium, tin, or lead; or a salt of sulfate, nitrate, formate, succinate, malonate, chloroacetate, or p-toluenesufonate. Further, as a water-soluble polyvalent metal salt, a water-soluble inorganic polymer, such as polyaluminum chloride, may be employed. The water solubility is preferably at least 0.1 weight %, but more preferably 1 weight %. Of these, water-soluble salts consisting of aluminum, calcium, magnesium, and zinc are preferable, due to the lack of color of these metal ions. Specifically preferred are aluminum chloride, aluminum sulfate, aluminum nitrate, aluminum acetate, calcium chloride, calcium sulfate, calcium nitrate, calcium acetate, magnesium chloride, magnesium sulfate, magnesium nitrate, magnesium acetate, zinc chloride, zinc sulfate, zinc nitrate, and zinc acetate.

EXAMPLE

The present invention will now be specifically described with reference to examples, however the present invention is not limited thereto.

Example 1

Preparation of Ink

A carbon black pigment which features the pH and DBP absorption value cited in Table 1, and a solvent (being a water-based solvent), water and a polymer dispersing agent were mixed, after which the mixture was poured into a glass bottle with 200 g of 1.0 mm zirconia beads after which the bottle was tightly sealed, and then dispersion treatment was conducted for 2 hours employing a paint shaker, to obtain a pigment dispersion solution. After the zirconia beads were removed, this dispersion solution was filtered and membrane degassing treated employing a hollow fiber membrane, resulting in Inks 101-130. The compounding ratio of the solvent, water, and polymer dispersing agent is as follows.

| | |
|---|---|
| Carbon black pigment (please refer to Table 1) | 4.0 parts |
| Solvent (tripropylene glycol monomethyl ether) | 69.5 parts |
| Water | 25.0 parts |
| Polymer dispersing agent (being acrylic-styrene copolymer) | 1.5 parts |

The surface tension the solvent (tripropylene glycol monomethyl ether) was 30 mN/m at 25° C. the viscosity was 6.2 mPa·s at 25° C. and the vapor pressure was 4 Pa at 25° C.

Carbon black pigments employed in the Examples are listed in Table 1, but the employable pigments are not limited thereto, and pigments exhibiting a pH and DBP absorption in the stated range may be employed.

Other than the above materials, the following may be similarly employed.

Solvent
  DPGmME: Dipropylene glycol monomethyl ether
  DPGmEE: Dipropylene glycol mono-ethyl ether
  DEGmBE: Diethylene glycol monobutyl ether
  2,4-PDO: 2-methyl-2,4-pentane diol
  EGmBE: Ethylene glycol monobutyl ether
  1,5-PDO: 1,5-pentane diol
  EtOH: Ethanol
  2-PDN: 2-pyrrolidone
  DEG: Diethylene glycol Polymer Dispersing Agent
  The copolymer obtained by polymerization of methacrylic acid, methyl methacrylate, 2-ethylhexyl methacrylate, and acrylic acid hydroxyethyl (with a respective weight ratio of 40:20:10:30)
  Latex at a weight average molecular weight of 12,000: Nipol SX-1706 (an acrylic ester copolymer, being a soap-free latex, produced by Zeon Corp.)
  Acrylic-styrene copolymer: DispersBYK (produced by BYK-Chemie GmbH)
  Acrylic-styrene copolymer: efka4570 (produced by Efka Additives, Inc.)

Surface Active Agent
  S-104: Surfinol 104 (produced by Air Products and Chemicals, Inc.)

Mildewcide
  PROXEL: produced by Avecia Ltd.

Measurement of Characteristic Value of Ink Material and Ink (Measurement of Average Particle Diameter of Carbon Black Pigment Dispersion Element)
  The Brownian Motion of particles in the dispersion solution was detected with a dynamic light scattering method at 25° C. and particle size was calculated to determine the average particle diameter. Zetasizer, manufactured by Malvern Instruments Co., Ltd., was employed as a measuring apparatus.

(pH Measurement of Carbon Black Pigment)
  pH of the water dispersion solution of the carbon black pigment was measured at 25° C. The measuring apparatus was ion pH meter IM-55G, manufactured by DKK-TOA Corp.

(Measurement of DBP Oil Absorption of Carbon Black Pigment)
  Measurement was conducted based on JIS K6217-4.

(Measurement of Surface Tension of Solvent)
  Dynamic surface tension was measured employing dynamic surface tension meter SV-100, manufactured by Kyowa Interface Science Co., Ltd.

(Measurement of Viscosity of Solvent and Ink)
  The viscosity was measured at 25° C. employing an oscillating viscometer using the changes of amplitude of small oscillation detected by the sensor with viscosity measurement solution. The measurement apparatus was SV-100, manufactured by A&D Co., Ltd.

Evaluation of Ink

Evaluation of Ejection Property
  Inks 101-130 prepared as above was each ejected employing a share mode piezo type recording head, featuring a nozzle orifice of 25 μm, an ejected ink droplet volume of 4 pl, a driving frequency of 10 kHz, and a nozzle number of 512, to evaluate ejection property. The driving voltage was adjusted to obtain an ejection rate of 6 m/s.
  Ejection was continuously conducted until all the 500 ml ink was ejected under the conditions of 25° C. and 50% RH, and oblique ejection and nozzle missing due to clogging were visually observed, to evaluate ejection properties based on the following criteria.
  A: From each of the nozzles, ejection was stable untill the last drop.
  B: Toward the end, oblique ejection and/or nozzle missing due to clogging were noted from 1-20 nozzles.

C: Toward the end, oblique ejection and/or nozzle missing due to clogging were noted from 21-40 nozzles.

Ink materials and ink characteristic values, evaluated results of ejection and text quality are shown in Table 1.

TABLE 1

| | | Carbon Black Pigment | | | | | | | |
|---|---|---|---|---|---|---|---|---|---|
| Ink No. | Name | Manufacturer | pH | DBP Oil Absorption (cm³/100 g) | Average Particle Diameter of Dispersion Element (nm) | Ink Viscosity (mPa·s) | Ejection Properties | Printing Quality | Remarks |
| 101 | #2350 | *1 | 2.0 | 45 | 132 | 12.5 | A | A | Inv. |
| 102 | #2420 | *1 | 2.0 | 85 | 124 | 13.0 | A | A | Inv. |
| 103 | FW2 | Degussa AG | 2.5 | 145 | 145 | 11.4 | A | A | Inv. |
| 104 | #1000 | *1 | 3.0 | 55 | 122 | 12.9 | A | A | Inv. |
| 105 | MA-8 | *1 | 3.0 | 58 | 107 | 15.2 | A | A | Inv. |
| 106 | MA-7 | *1 | 3.0 | 65 | 109 | 14.6 | A | A | Inv. |
| 107 | MA-77 | *1 | 3.0 | 65 | 114 | 13.5 | A | A | Inv. |
| 108 | MA-220 | *1 | 3.0 | 91 | 125 | 11.9 | A | A | Inv. |
| 109 | MA-11 | *1 | 3.5 | 65 | 168 | 12.2 | A | A | Inv. |
| 110 | #970 | *1 | 3.5 | 80 | 136 | 13.8 | A | A | Inv. |
| 111 | MA-100 | *1 | 3.5 | 100 | 130 | 13.2 | A | A | Inv. |
| 112 | MA-100R | *1 | 3.5 | 100 | 141 | 12.4 | A | A | Inv. |
| 113 | Printex U | Degussa AG | 4.5 | 115 | 150 | 12.0 | A | B | Inv. |
| 114 | #8300 | *2 | 5.0 | 76 | 166 | 11.2 | A | B | Inv. |
| 115 | #8500 | *2 | 5.5 | 96 | 175 | 15.6 | A | B | Inv. |
| 116 | #50 | *1 | 6.0 | 150 | 155 | 15.1 | A | B | Inv. |
| 117 | #5500 | *2 | 6.0 | 155 | 399 | 25.0 | B | C | Comp. |
| 118 | #2600 | *1 | 6.5 | 70 | 412 | 25.3 | B | C | Comp. |
| 119 | #4500 | *2 | 6.5 | 135 | 458 | 22.4 | B | C | Comp. |
| 120 | #7100 | *2 | 7.0 | 66 | 506 | 27.2 | C | C | Comp. |
| 121 | #7400 | *2 | 7.0 | 73 | 472 | 23.6 | C | C | Comp. |
| 122 | #7350 | *2 | 7.0 | 100 | 450 | 29.5 | C | D | Comp. |
| 123 | N326 | Showa Cabot K.K. | 7.0 | 121 | 558 | 26.5 | C | D | Comp. |
| 124 | #7550 | *2 | 7.5 | 53 | 475 | 33.5 | C | D | Comp. |
| 125 | N219 | Showa Cabot K.K. | 7.5 | 78 | 706 | 30.6 | D | D | Comp. |
| 126 | #45 | *1 | 8.0 | 53 | 847 | 29.6 | D | D | Comp. |
| 127 | #900 | *1 | 8.0 | 56 | 904 | 31.5 | D | E | Comp. |
| 128 | #980 | *1 | 8.0 | 66 | 985 | 30.8 | D | E | Comp. |
| 129 | #32 | *1 | 8.0 | 100 | 875 | 39.6 | D | E | Comp. |
| 130 | #750 | *1 | 8.0 | 115 | 862 | 40.8 | D | E | Comp. |

Comp.: Comparative example, Inv.: This invention,
*1: Mitsubishi Chemical Corp.
*2: Tokai Carbon Co., Ltd.

D: Toward the end, oblique ejection and/or nozzle missing due to clogging were noted from more than 41 nozzles.

Evaluation of Text Quality

The above prepared inks were ejected to print a solid image and 3- and 4-point Ming-type characters of Japanese Hiragana phonetic script "(a), (i), (u), (e), (o)", onto one side of an A4 sheet of first-class plain paper produced by Konica Minolta Business Technology, Inc., employing a shuttle head method piezo type recording head featuring a nozzle olifice of 25 μm, and 512 nozzles, under the conditions of a recording resolution of 1,440×1,440 dpi (dpi means dots per inch, being 2.54 cm), an ink coverage of 10 ml/m², and an image size of 280×200 mm. The text image was visually observed to evaluate text quality based on the following criteria.

The text images of 3- and 4-point Ming-type characters of Japanese Hiragana phonetic script "(a), (i), (u), (e), (o)" prepared as above were visually observed to evaluate text quality based on the following criteria.

A: A 3-point text image was distinct in every detail.
B: Even 3-point characters were legible.
C: Parts of 3-point characters were blurred, but 4-point characters were legible.
D: Parts of 4-point characters were blurred.
E: Most 4-point characters were blurred and illegible.

As is apparent from Table 1, a solvent satisfying the conditions defined in this invention regarding surface tension and viscosity, and carbon black ink within the range defined by this invention, exhibit superior ink ejection and high text quality recorded onto plain paper employing this ink, compared to the comparative examples.

Example 2

Inks 201-230 were prepared in the same manner as Example 1, except that the solvent (tripropylene glycol monomethyl ether) employed in Example 1 was replaced with 2-methyl-2,4-pentane diol exhibiting a lower surface tension, and measurement and evaluation were conducted in the same manner as in Example 1, the results of which are shown in Table 2.

The solvent (2-methyl-2,4-pentane diol) exhibited a surface tension of 26 mN/m at 25° C. a viscosity of 31 mPa·s at 25° C. and a vapor pressure of 2.7 Pa at 25° C.

TABLE 2

| Ink No. | Carbon Black Pigment Name | Manufacturer | pH | DBP Oil Absorption (cm³/100 g) | Average Particle Diameter of Dispersion Element (nm) | Ink Viscosity (mPa·s) | Ejection Properties | Printing Quality | Remarks |
|---|---|---|---|---|---|---|---|---|---|
| 201 | #2350 | *1 | 2.0 | 45 | 136 | 19.6 | A | A | Inv. |
| 202 | #2420 | *1 | 2.0 | 85 | 126 | 18.5 | A | A | Inv. |
| 203 | FW2 | Degussa AG | 2.5 | 145 | 150 | 20.6 | A | A | Inv. |
| 204 | #1000 | *1 | 3.0 | 55 | 133 | 21.1 | A | A | Inv. |
| 205 | MA-8 | *1 | 3.0 | 58 | 119 | 19.6 | A | A | Inv. |
| 206 | MA-7 | *1 | 3.0 | 65 | 133 | 19.1 | A | A | Inv. |
| 207 | MA-77 | *1 | 3.0 | 65 | 127 | 20.8 | A | A | Inv. |
| 208 | MA-220 | *1 | 3.0 | 91 | 152 | 20.3 | A | A | Inv. |
| 209 | MA-11 | *1 | 3.5 | 65 | 132 | 18.8 | A | A | Inv. |
| 210 | #970 | *1 | 3.5 | 80 | 139 | 19.7 | A | A | Inv. |
| 211 | MA-100 | *1 | 3.5 | 100 | 130 | 19.3 | A | A | Inv. |
| 212 | MA-100R | *1 | 3.5 | 100 | 147 | 21.3 | A | A | Inv. |
| 213 | Printex U | Degussa AG | 4.5 | 115 | 128 | 21.9 | A | B | Inv. |
| 214 | #8300 | *2 | 5.0 | 76 | 126 | 22.4 | A | B | Inv. |
| 215 | #8500 | *2 | 5.5 | 96 | 133 | 19.9 | A | B | Inv. |
| 216 | #50 | *1 | 6.0 | 150 | 159 | 19.5 | A | B | Inv. |
| 217 | #5500 | *2 | 6.0 | 155 | 402 | 26.9 | B | C | Comp. |
| 218 | #2600 | *1 | 6.5 | 70 | 478 | 28.6 | B | C | Comp. |
| 219 | #4500 | *2 | 6.5 | 135 | 502 | 30.6 | B | C | Comp. |
| 220 | #7100 | *2 | 7.0 | 66 | 589 | 33.2 | C | C | Comp. |
| 221 | #7400 | *2 | 7.0 | 73 | 501 | 39.5 | C | C | Comp. |
| 222 | #7350 | *2 | 7.0 | 100 | 488 | 40.5 | C | D | Comp. |
| 223 | N326 | Showa Cabot K.K. | 7.0 | 121 | 426 | 41.6 | C | D | Comp. |
| 224 | #7550 | *2 | 7.5 | 53 | 551 | 37.2 | C | D | Comp. |
| 225 | N219 | Showa Cabot K.K. | 7.5 | 78 | 854 | 45.2 | D | D | Comp. |
| 226 | #45 | *1 | 8.0 | 53 | 889 | 36.8 | D | D | Comp. |
| 227 | #900 | *1 | 8.0 | 56 | 821 | 40.2 | D | E | Comp. |
| 228 | #980 | *1 | 8.0 | 66 | 985 | 51.2 | D | E | Comp. |
| 229 | #32 | *1 | 8.0 | 100 | 807 | 44.3 | D | E | Comp. |
| 230 | #750 | *1 | 8.0 | 115 | 896 | 49.6 | D | E | Comp. |

Comp.: Comparative example, Inv.: This invention,
*1: Mitsubishi Chemical Corp.
*2: Tokai Carbon Co., Ltd.

As is apparent from Table 2, the solvent satisfying the conditions defined by this invention regarding the surface tension and viscosity, and the carbon black ink within the range defined by this invention, exhibit superior ink ejection and high text quality recorded on plain paper employing this ink, compared to the comparative examples, even when a lower surface tension solvent was employed.

Example 3

Inks 301-330 were prepared in the same manner as Example 1, except that the solvent (tripropylene glycol monomethyl ether) employed in Example 1 was replaced with propylene glycol exhibiting a higher surface tension, and measurement and evaluation were conducted in the same manner as in Example 1. The results are shown in Table 3.

Here, the solvent (propylene glycol) exhibited a surface tension of 35.6 mN/m, a viscosity of 50 mPa·s and a vapor pressure of 10.7 Pa, all at 25° C.

TABLE 3

| Ink No. | Carbon Black Pigment Name | Manufacturer | pH | DBP Oil Absorption (cm³/100 g) | Average Particle Diameter of Dispersion Element (nm) | Ink Viscosity (mPa·s) | Ejection Properties | Printing Quality | Remarks |
|---|---|---|---|---|---|---|---|---|---|
| 301 | #2350 | *1 | 2.0 | 45 | 132 | 16.5 | A | A | Inv. |
| 302 | #2420 | *1 | 2.0 | 85 | 124 | 17.8 | A | A | Inv. |
| 303 | FW2 | Degussa AG | 2.5 | 145 | 145 | 18.6 | A | A | Inv. |
| 304 | #1000 | *1 | 3.0 | 55 | 122 | 17.3 | A | A | Inv. |
| 305 | MA-8 | *1 | 3.0 | 58 | 107 | 17.7 | A | A | Inv. |
| 306 | MA-7 | *1 | 3.0 | 65 | 109 | 19.2 | A | A | Inv. |
| 307 | MA-77 | *1 | 3.0 | 65 | 114 | 19.6 | A | A | Inv. |
| 308 | MA-220 | *1 | 3.0 | 91 | 125 | 16.8 | A | A | Inv. |
| 309 | MA-11 | *1 | 3.5 | 65 | 168 | 16.4 | A | A | Inv. |

TABLE 3-continued

| Ink No. | Carbon Black Pigment | | | | Ink Viscosity (mPa·s) | Ejection Properties | Printing Quality | Remarks |
| --- | --- | --- | --- | --- | --- | --- | --- | --- |
| | Name | Manufacturer | pH | DBP Oil Absorption (cm³/100 g) | Average Particle Diameter of Dispersion Element (nm) | | | |
| 310 | #970 | *1 | 3.5 | 80 | 136 | 18.8 | A | A | Inv. |
| 311 | MA-100 | *1 | 3.5 | 100 | 130 | 19.7 | A | A | Inv. |
| 312 | MA-100R | *1 | 3.5 | 100 | 141 | 19.0 | A | A | Inv. |
| 313 | Printex U | Degussa AG | 4.5 | 115 | 150 | 16.8 | A | B | Inv. |
| 314 | #8300 | *2 | 5.0 | 76 | 166 | 16.4 | A | B | Inv. |
| 315 | #8500 | *2 | 5.5 | 96 | 175 | 15.8 | A | B | Inv. |
| 316 | #50 | *1 | 6.0 | 150 | 155 | 19.5 | A | B | Inv. |
| 317 | #5500 | *2 | 6.0 | 155 | 362 | 30.5 | B | C | Comp. |
| 318 | #2600 | *1 | 6.5 | 70 | 447 | 35.6 | B | C | Comp. |
| 319 | #4500 | *2 | 6.5 | 135 | 482 | 34.2 | B | C | Comp. |
| 320 | #7100 | *2 | 7.0 | 66 | 549 | 38.9 | C | C | Comp. |
| 321 | #7400 | *2 | 7.0 | 73 | 506 | 34.2 | C | C | Comp. |
| 322 | #7350 | *2 | 7.0 | 100 | 489 | 36.5 | C | D | Comp. |
| 323 | N326 | Showa Cabot K.K. | 7.0 | 121 | 594 | 31.8 | C | D | Comp. |
| 324 | #7550 | *2 | 7.5 | 53 | 667 | 33.9 | C | D | Comp. |
| 325 | N219 | Showa Cabot K.K. | 7.5 | 78 | 659 | 29.8 | D | D | Comp. |
| 326 | #45 | *1 | 8.0 | 53 | 784 | 29.5 | D | D | Comp. |
| 327 | #900 | *1 | 8.0 | 56 | 721 | 31.7 | D | E | Comp. |
| 328 | #980 | *1 | 8.0 | 66 | 754 | 31.5 | D | E | Comp. |
| 329 | #32 | *1 | 8.0 | 100 | 900 | 31.6 | D | E | Comp. |
| 330 | #750 | *1 | 8.0 | 115 | 869 | 40.5 | D | E | Comp. |

Comp.: Comparative example, Inv.: This invention,
*1: Mitsubishi Chemical Corp.
*2: Tokai Carbon Co., Ltd.

As is apparent from Table 3, the solvents satisfying the conditions defined by this vention regarding the surface tension and viscosity, and the carbon black ink within the rang defined by this invention, exhibit superior ink ejection and high text quality on plain paper employing this ink, compared to the comparative examples, even when a higher surface tension solvent was employed.

What is claimed is:

1. A black ink for ink-jet printing comprising:
   a) a carbon black pigment exhibiting a DBP oil absorption of not more than 150 cm³/100 g and a pH of more than 6,
   b) a solvent exhibiting a surface tension of 25-40 mN/m at 25° C., a viscosity of 1-50 mPa·s at 25° C., and a vapor pressure of not more than 133 Pa at 25° C., a solvent content of which being not less than 50 weight % and not more than 90 weight % based on the total ink weight, and
   c) water, a water content of which being not less than 10 weight % and less than 45 weight %.

2. The black ink for ink-jet printing of claim 1, wherein the solvent exhibits a surface tension of 25-30 mN/m at 25° C., and the viscosity of 3-30 mPa·s at 25° C.

3. The black ink for ink-jet printing of claim 1, wherein the vapor pressure of the solvent at 25° C. is 1-70 Pa.

4. The black ink for ink-jet printing of claim 1, wherein the solvent content is not less than 65 weight % and less than 80 weight % based on the total weight of the ink, and also the water content is not less than 20 weight % and less than 35 weight %.

5. The black ink for ink-jet printing of claim 1, wherein the solvent contains a polyalcohol or derivative thereof.

6. The black ink for ink-jet printing of claim 5, wherein the polyalcohol, or derivative thereof, is triethylene glycol monomethyl ether, dipropylene glycol monomethyl ether, tripropylene glycol monomethyl ether, or 2-methyl-2,4-pentane diol.

7. The black ink for ink-jet printing of claim 1, wherein the carbon black pigment is an oil-furnace carbon black pigment.

8. The black ink for ink-jet printing of claim 7, wherein the carbon black pigment is an oil-furnace carbon black pigment exhibiting a pH of not more than 4.

9. The black for ink-jet printing of claim 7, wherein the carbon black pigment is an oil-furnace carbon black pigment exhibiting a pH of 2.0-3.5, and a DBP oil absorption of 55-145 cm³/100 g.

* * * * *